United States Patent [19]
Nissim et al.

[11] Patent Number: 5,931,119
[45] Date of Patent: Aug. 3, 1999

[54] SELF CLEANING PET LITTER BOX

[75] Inventors: Ofer Nissim, Pound Ridge, N.Y.; Eric Schade, Stamford; Martin Hoffmann, Danbury, both of Conn.

[73] Assignee: Knox Security Engineering Corp., Norwalk, Conn.

[21] Appl. No.: 08/642,654

[22] Filed: May 3, 1996

[51] Int. Cl.$^6$ .................................................. A01K 1/01
[52] U.S. Cl. .......................................... 119/163; 119/166
[58] Field of Search .................................... 119/163, 161, 119/166

[56] References Cited

U.S. PATENT DOCUMENTS

| | | | |
|---|---|---|---|
| 3,954,086 | 5/1976 | Maness | 119/163 |
| 4,574,735 | 3/1986 | Hohenstein | 119/163 |
| 4,854,267 | 8/1989 | Morrow | 119/161 |
| 5,048,465 | 9/1991 | Carlisi | 119/166 |
| 5,107,797 | 4/1992 | LaRoche | 119/166 |
| 5,178,099 | 1/1993 | Lapps et al. | 119/166 |
| 5,181,480 | 1/1993 | Dabolt | 119/165 |
| 5,279,258 | 1/1994 | Kakuta | 119/164 |
| 5,477,812 | 12/1995 | Waters | 119/163 |
| 5,662,066 | 9/1997 | Reitz | 119/163 |
| 5,749,318 | 5/1998 | Barbot et al. | 119/166 |

*Primary Examiner*—Jack W. Lavinder
*Assistant Examiner*—Yvonne R. Abbott
*Attorney, Agent, or Firm*—Patrick J. Walsh

[57] ABSTRACT

A self cleaning pet litter box for receiving animal waste including an upwardly open pan containing cat litter being mounted for rotation on a support frame, a collection container for receiving animal waste removed from the pan, a raking mechanism for gathering and removing animal waste from the rotating cat litter pan into the collection container. A supply chamber replenishes litter to the pan. The litter box includes an electronic control system including an electro-optical intrusion detector.

13 Claims, 16 Drawing Sheets

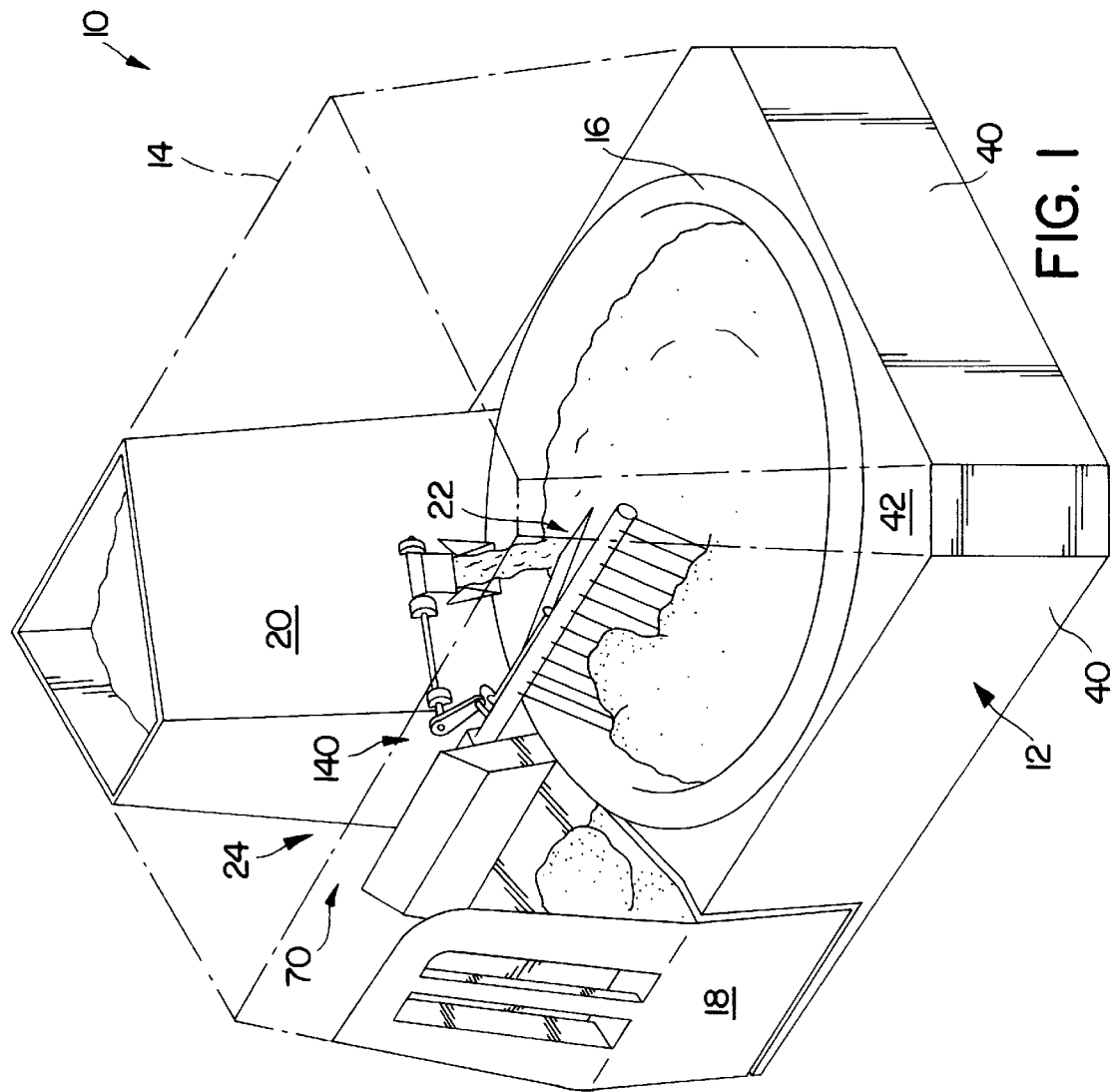

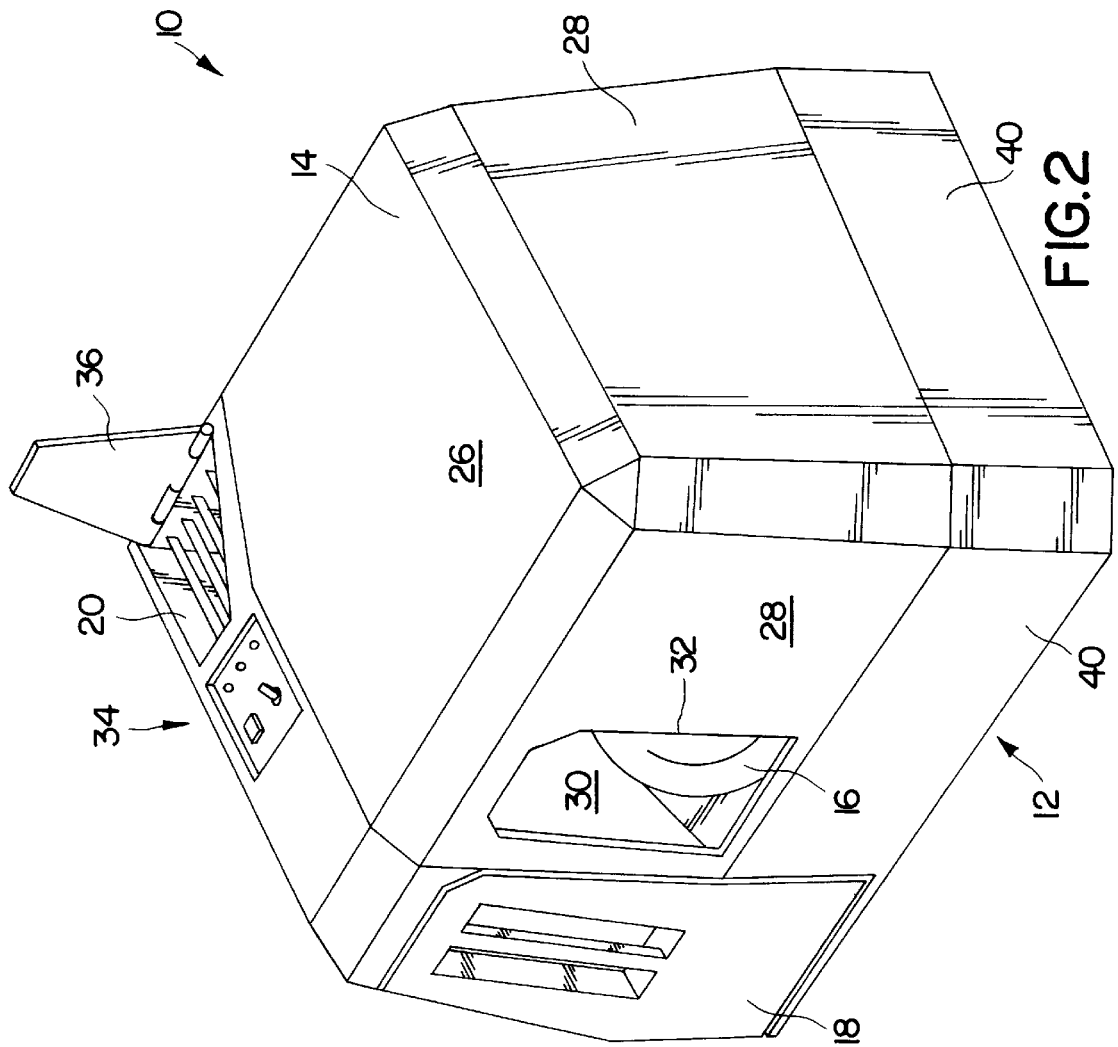

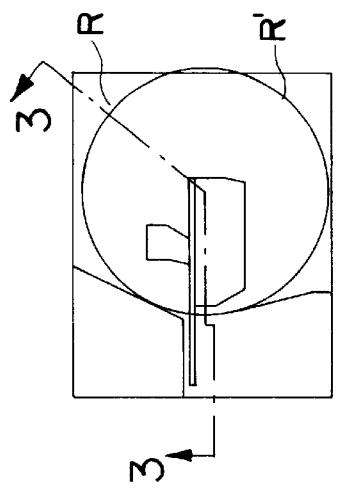
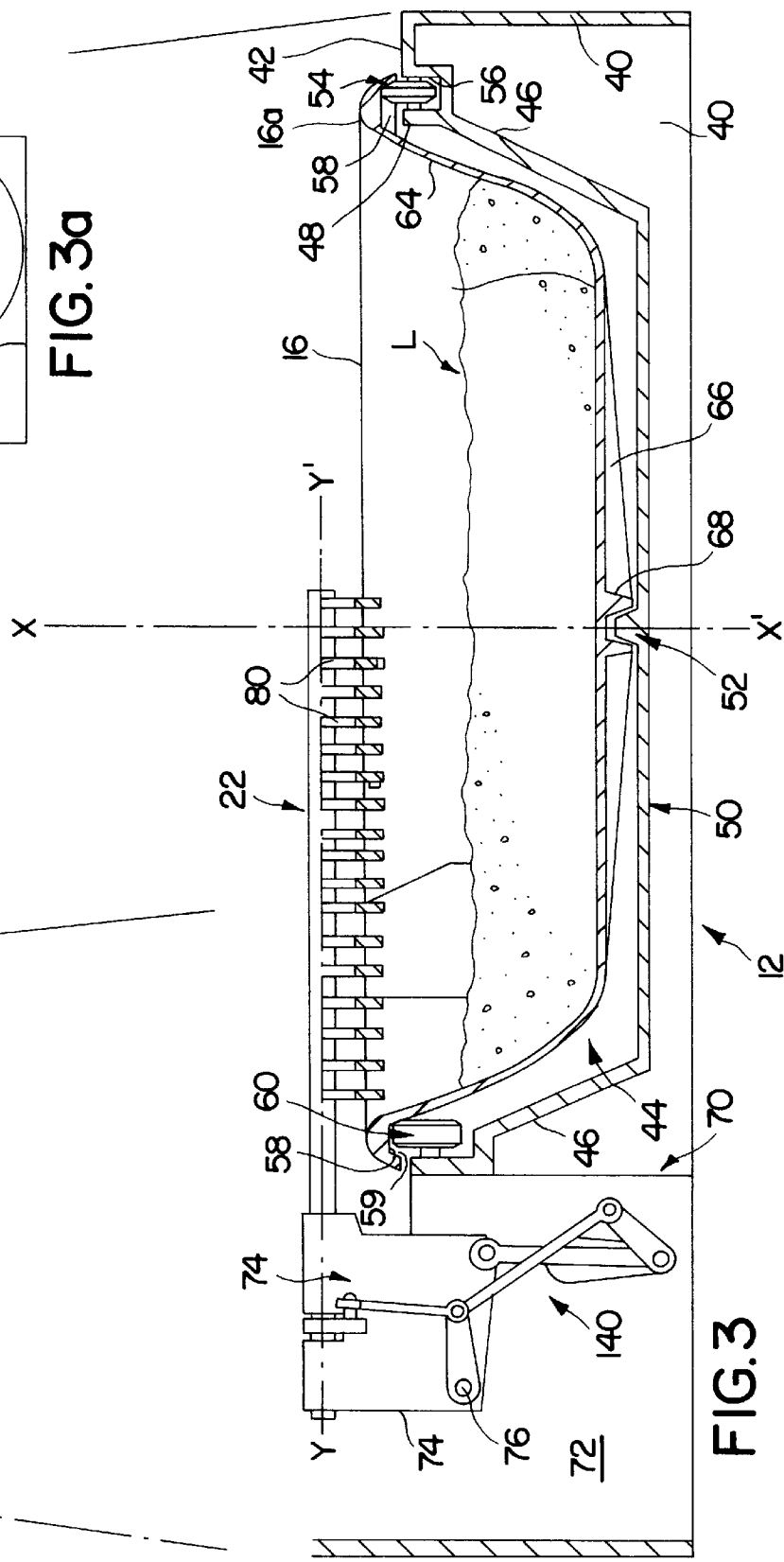

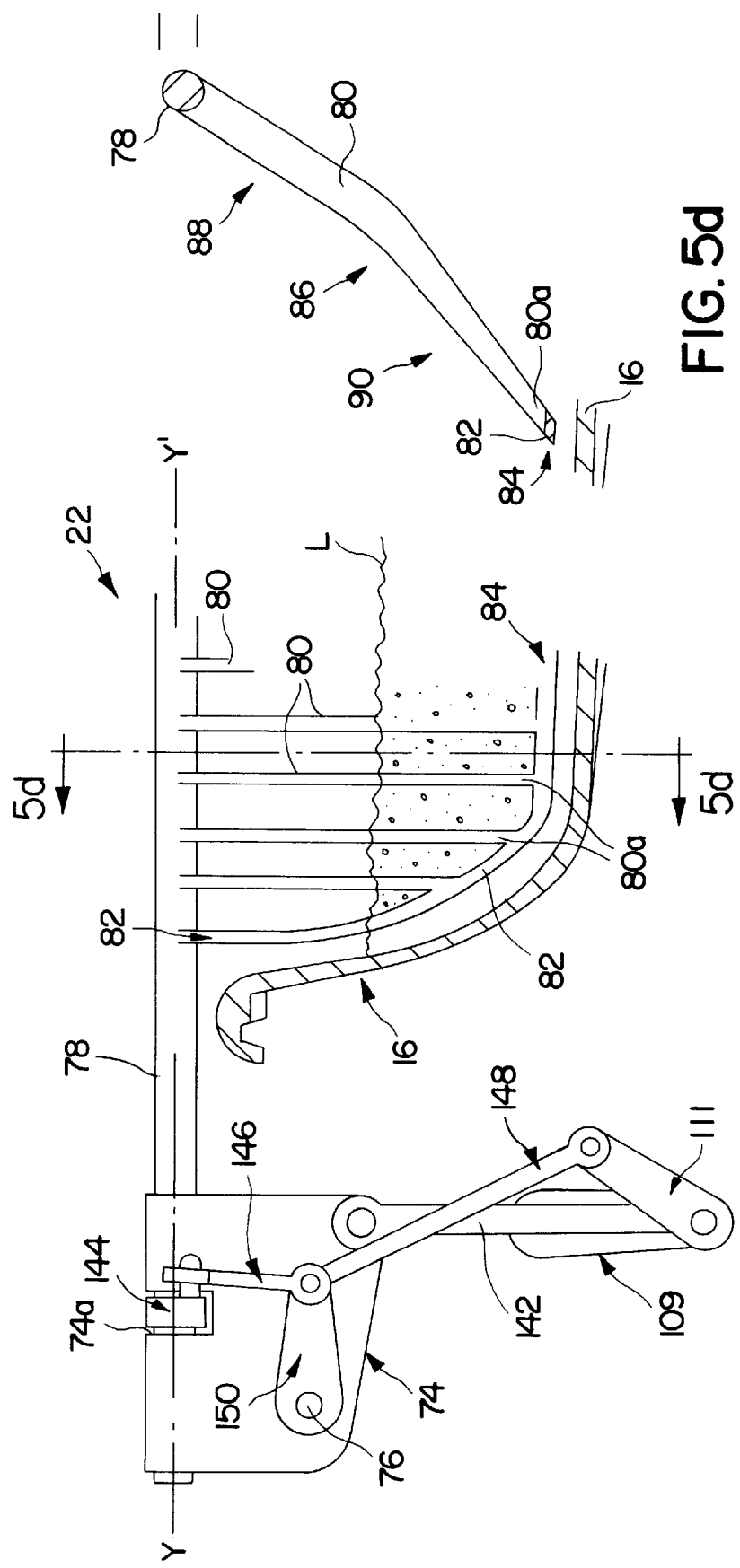

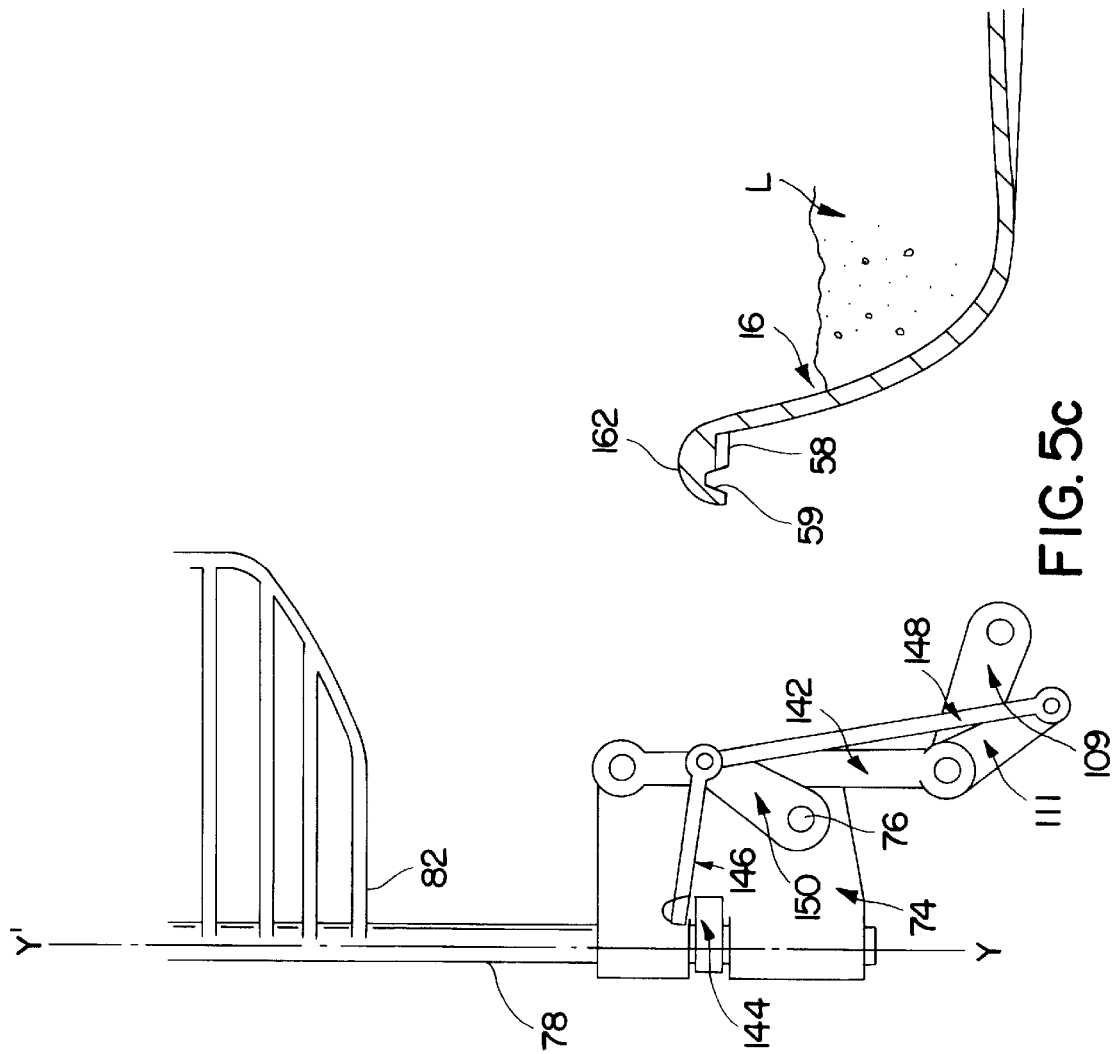

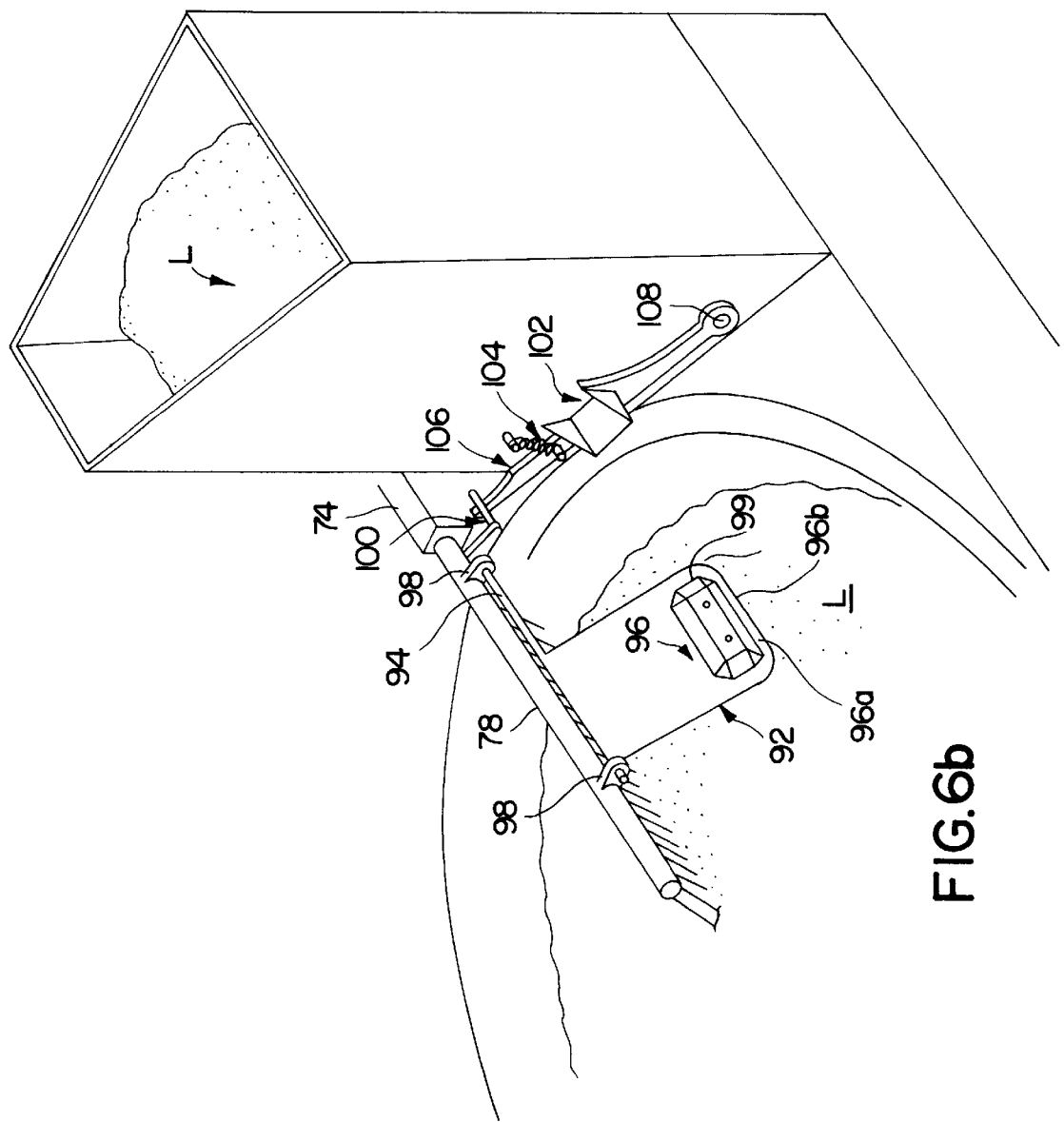

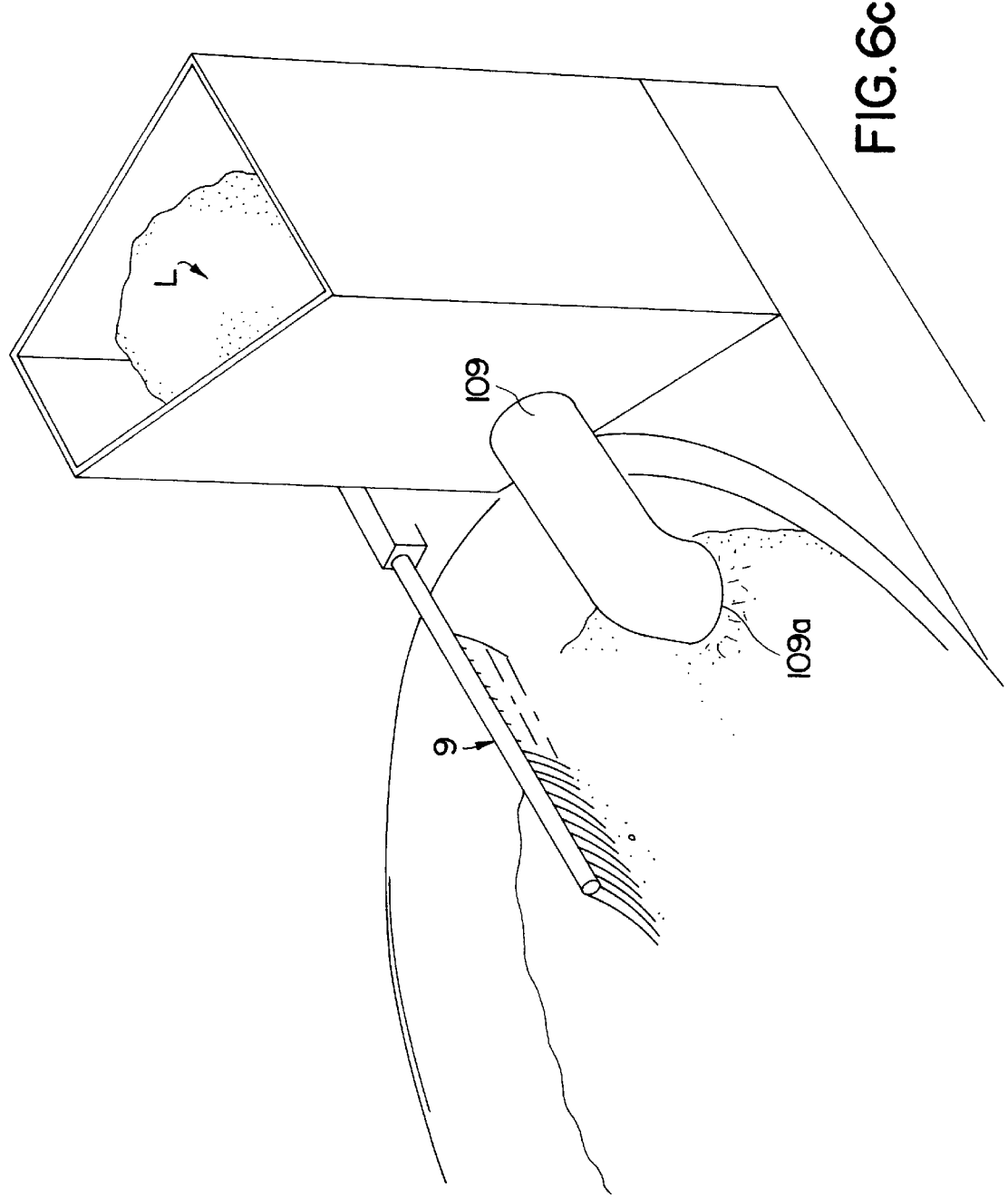

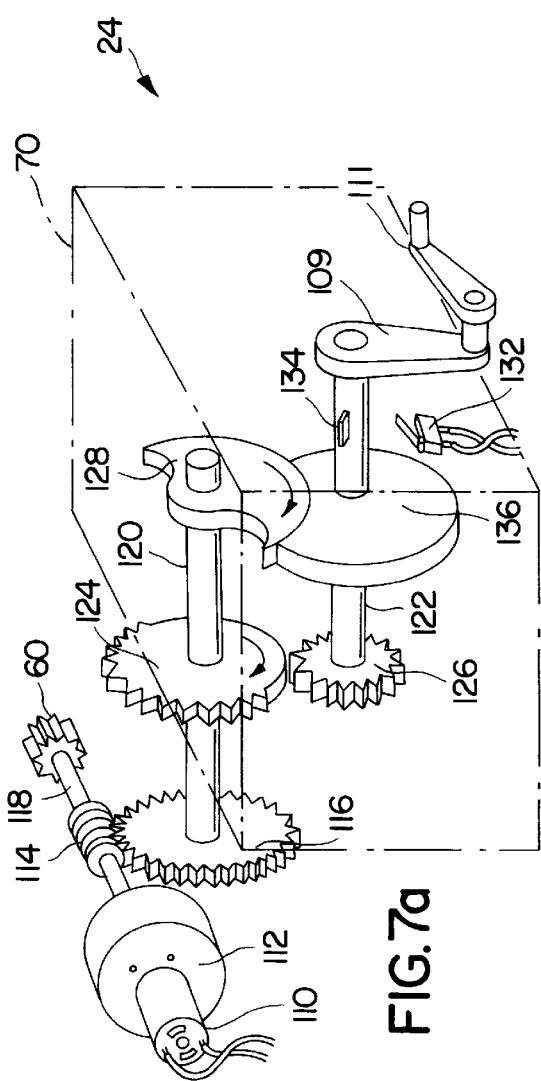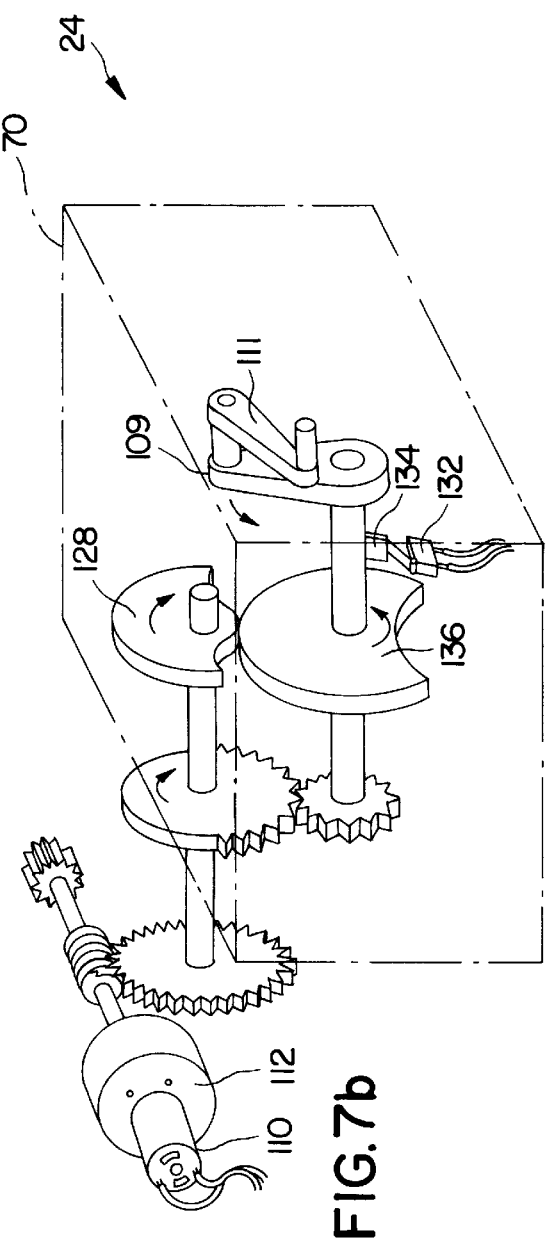

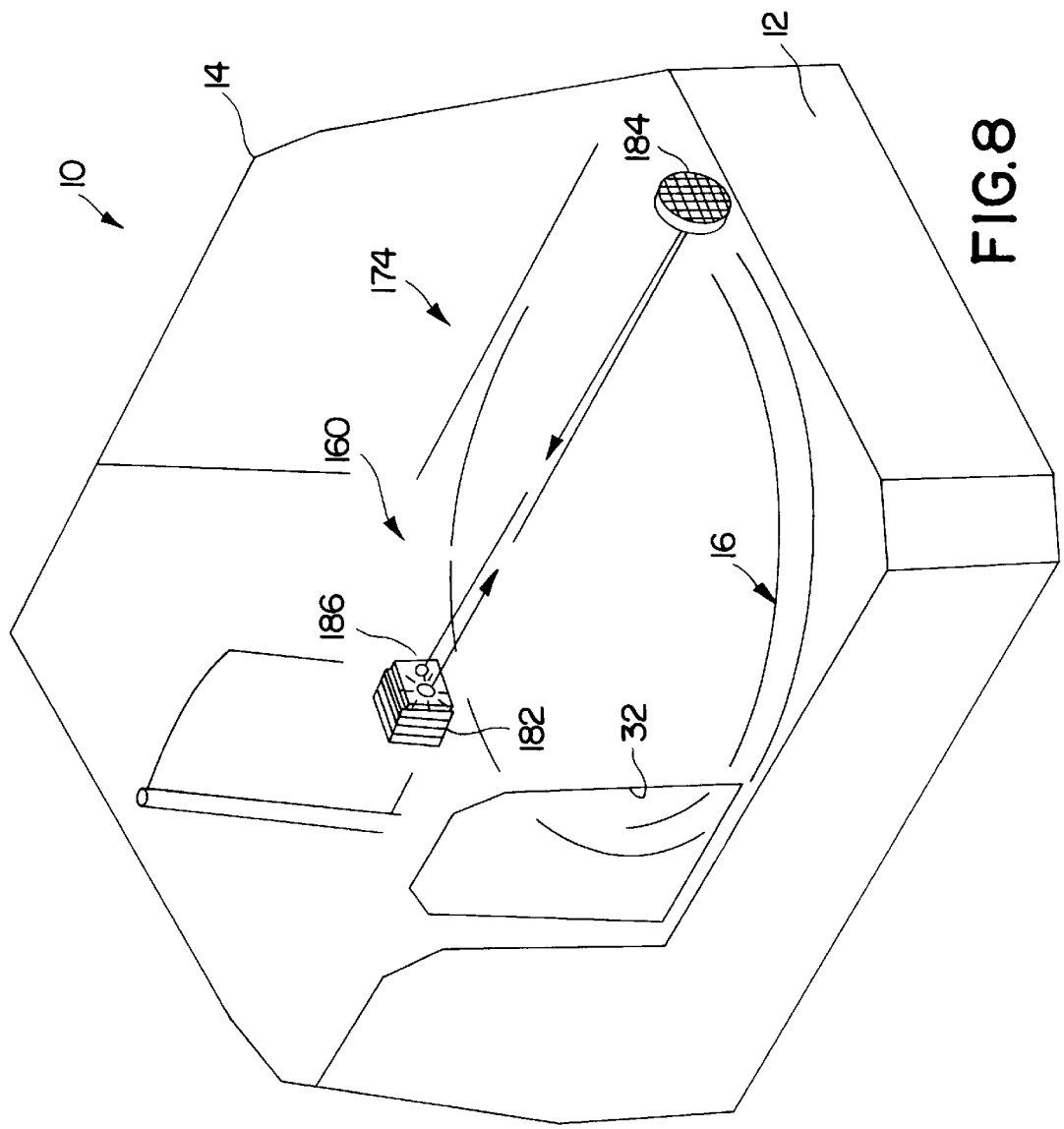

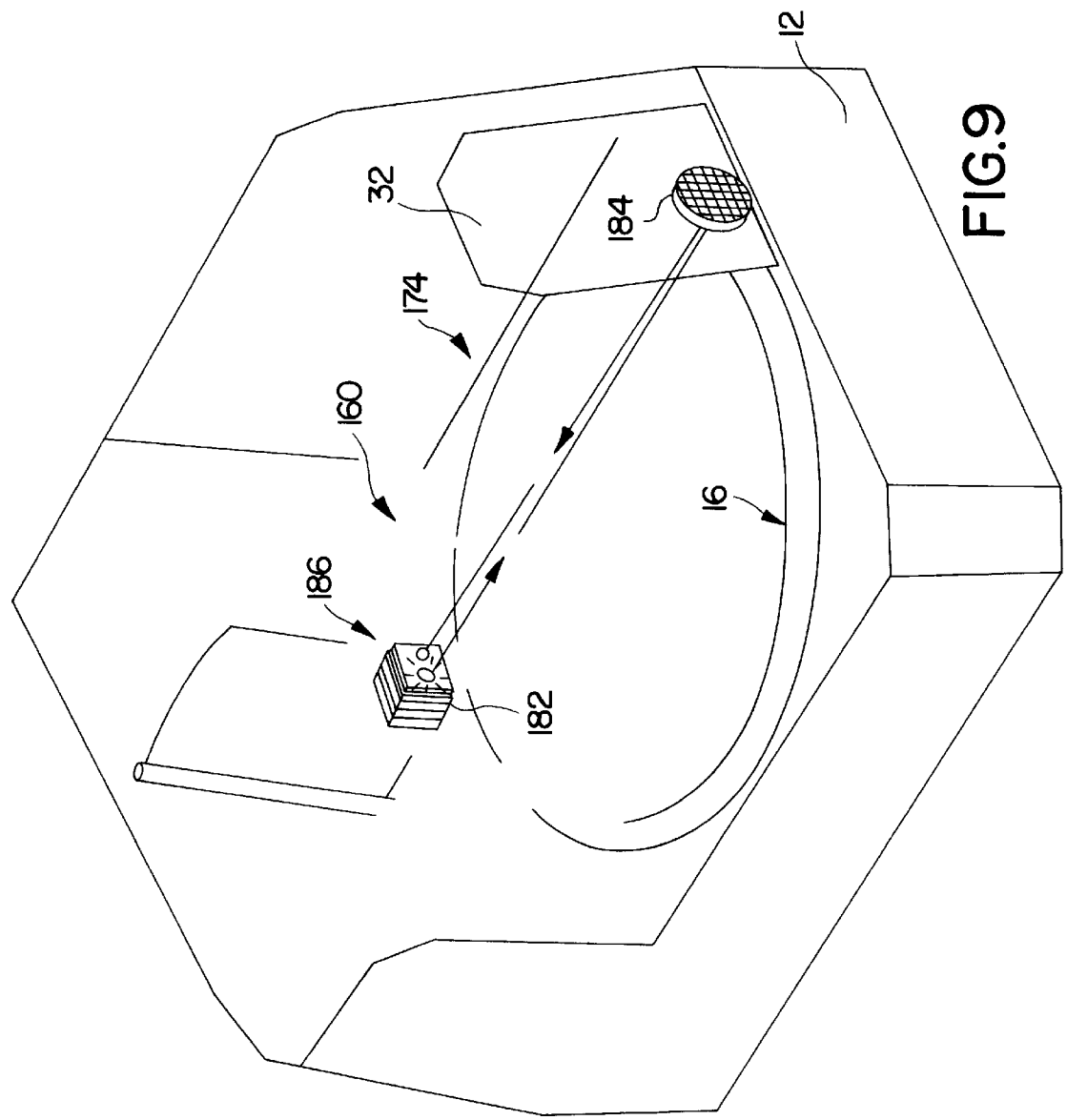

SELF CLEANING PET LITTER BOX

BACKGROUND OF THE INVENTION

The present invention relates to litter boxes for pets, particularly for household cats, wherein the litter box is self cleaning over an extended time period without intervention by the pet owner.

Pet owners especially those having household cats must provide litter boxes for pet waste in order to maintain a sanitary condition and minimize pet odor. Litter boxes are a welcome accommodation making it much easier to keep a household cat. However, the owner has the regular chore of cleaning the litter box and replenishing the cat litter to maintain sanitary conditions and to keep to a minimum the noxious odor given off by accumulated pet waste. The owner also has the problem of providing for pet needs in this regard, when the owner is away on vacation or otherwise travelling for an extended period.

There is need for an automated, self cleaning pet litter box capable of reliable operation for extended periods without intervention. The present invention provides a self cleaning pet litter box that provides and maintains a clean, sanitary, and odor free litter box.

SUMMARY OF THE INVENTION

The present invention comprises a self contained, self cleaning automated cat litter box that contains a supply of cat litter, provides for periodic removal of pet waste from the cat litter to a sealed storage receptacle, and replenishes cat litter as required to maintain the supply of fresh litter at a predetermined level in the box. The cat litter box is operable for extended time periods without owner intervention thereby relieving the owner of the regular chore of cleaning and tending the box, and permitting the owner to remain away on vacation, for example, while the pets needs are accommodated. The litter box operates in a safe and reliable manner with a minimal power requirement that is supplied by battery or household electricity.

In accordance with the invention, a pet litter box comprises a shallow circular pan that contains an absorbent media such as cat litter and is mounted on a supporting frame for horizontal rotation. A cleaning mechanism including a retractable rake removes solid waste and litter clumps saturated with liquid wastes, and deposits these wastes into a re-sealing collection receptacle for rapid elimination of odors.

A litter level sensor monitors the level of cat litter in the pan and adds cat litter as needed to assure a constant optimal level.

An electronic control system including an electro-optical intrusion detector provides for periodic cycling of the operating components of the litter box to remove waste and replenish media. The control system prevents operation of the system with an animal present, and utilizes time delay circuitry to initiate litter box cyclic operation after a time lapse following departure of the animal.

In a household with more than one pet using the litter box, the feature of periodic cycling of the litter box according to the invention reduces litter box odors as well as disease exposure between pets.

The electronic control system includes a battery saving operating mode wherein the litter box is cycled several times a day, instead of cycling after a time lapse following each departure of an animal.

The entire self cleaning litter box is enclosed under a cover which mounts an electronic control panel, provides pet access to the litter box, aids in confining odor to the interior of the litter box, and enhances the appearance of the litter box.

The description below presupposes the use of the type of cat litter in fine particles that absorbs liquid waste and agglomerates into a large mass or clump with sufficient mechanical integrity to be raked from a bed of cat litter and removed in one piece. The clumping time for the litter to achieve such mechanical integrity is approximately ten minutes.

OBJECTS OF THE INVENTION

It is an object of the invention to provide an automatic self-cleaning pet litter box capable of maintaining a clean, sanitary, and odor free litter box for extended periods relieving the owner from the need to perform regular litter box chores.

It is an object of the invention to provide a pet litter box for effective removal of animal waste with minimal removal of absorbing media.

It is a further object of the invention to provide a pet litter box having a resealable collection receptacle for animal waste which reduces litter box odor.

It is a further object of the invention to provide a pet litter box with a litter level sensor which maintains a constant optimal level of cat litter as a normal operating feature of the box.

It is a further object of the invention to provide an electronic control system including an electro-optical intrusion detector as a safety system for assuring that the operating components of the litter box remain at rest while an animal is present and for an additional safe time period after the animal has departed.

It is a further object of the invention to provide an electronic control system that initiates the operating cycle of the litter box after lapse of a safe time period in order to remove waste from the litter pan to a sealed waste receptacle to minimize odor, and maintain a litter box sanitary condition an aspect of particular importance when more that one pet uses the facility.

It is a further object of the invention to provide an electronic control system that initiates the operating cycle of the litter box after lapse of a time period to allow wet litter to clump with sufficient mechanical integrity for removal by a rake.

It is a further object of the invention to provide a self-cleaning pet litter box with components of robust construction which function with minimal power requirements.

It is a further object of the invention to provide a self-cleaning pet litter box with low torque driving and cleaning mechanism which minimize power requirements of the electric drive motor for the mechanisms.

It is another object of the invention to provide a self-cleaning pet litter box with electrical circuitry for battery and household current operation.

It is another object of the invention to provide a self-cleaning pet litter box with electrical circuitry having fault monitoring so the system will shut down should battery voltage fall below a predetermined level, or should motor current exceed a predetermined level.

It is a further object of the invention to provide a self-cleaning pet litter box with normal power mode wherein the system may use battery or household wall outlet power.

It is a further object of the invention to provide a self-cleaning pet litter box with an automatic power saving mode wherein the litter box cycles three times a day for three minutes per cycle, and wherein the system components are selected, assembled, and designed for operation with D-cell batteries for an extended period of time, e.g., a year or longer.

It is another object of the invention to provide a self-cleaning pet litter box in a covered housing for mounting a control panel, for providing ready access for animal entry and departure, and for enhancing litter box appearance.

Other and further objects of the invention will occur to one skilled in the art with an understanding of the following detailed description of the invention or upon employment of the invention in practice.

DESCRIPTION OF THE DRAWING

A preferred embodiment of the invention has been chosen for purposes of illustrating the construction and operation of the invention and is shown in the accompanying drawing in which:

FIG. 1 is a perspective view of a preferred embodiment of litter box assembly according to the invention.

FIG. 2 is a perspective view of the litter box assembly of FIG. 1 with the cover in place.

FIG. 3 is a longitudinal section view taken along line 3—3 of FIG. 3a.

FIG. 3a is a diminutive reference plan view of the litter box showing the location of line 3—3.

FIGS. 5a, 5b, and 5c and are side elevational views partially in section of the rake drive linkage in sequential positions for raking the litter pan, dumping waste, and park, respectively.

FIG. 5d is a section taken along line 5d—5d of FIG. 5a.

FIGS. 6a–6b are perspective views illustrating sequence of components for sensing level of cat litter in the pan and for replenishing the pan with cat litter.

FIG. 6c is a perspective view illustrating a modified arrangement for replenishing the pan with cat litter.

FIGS. 7a–7b are perspective views of sequential positions of the drive train for rotating the litter pan and for manipulating the rake as the litter box cycles in removing waste from the pan.

FIG. 8 is a perspective schematic view showing location of the electro-optic sensor in position in the litter box chamber of the preferred embodiment.

FIG. 9 is a perspective schematic view showing location of the electro-optic sensor in position in the litter box chamber of a modified embodiment of the invention.

DETAILED DESCRIPTION OF THE INVENTION

Figure 4:
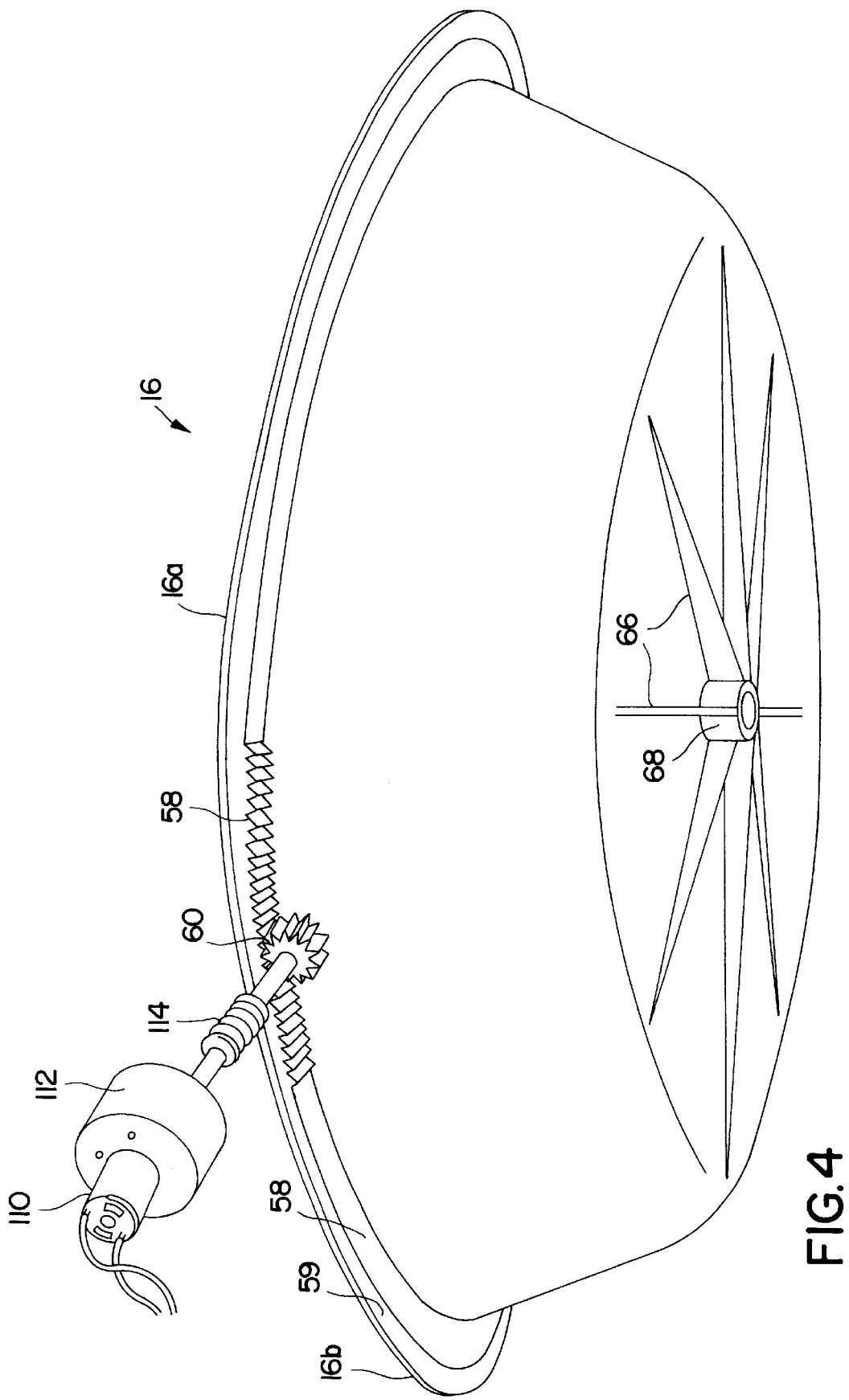
FIG. 4 is a perspective view of the underside of a subassembly of drive motor, gearbox, drive pinion and litter pan rim gear of the preferred embodiment.

Referring to FIGS. 1, 2, 3, and 3a of the drawing, a self cleaning pet litter box 10 according to the invention by way of general assembly comprises a box frame 12, removable cover 14, rotatable litter pan 16, removable waste receptacle 18, litter replenishment hopper 20, rake and litter level sensor 22, and driving mechanism 24 for the pan together with mechanical linkages 140 for manipulating the rake and level sensor.

Figure 5B:
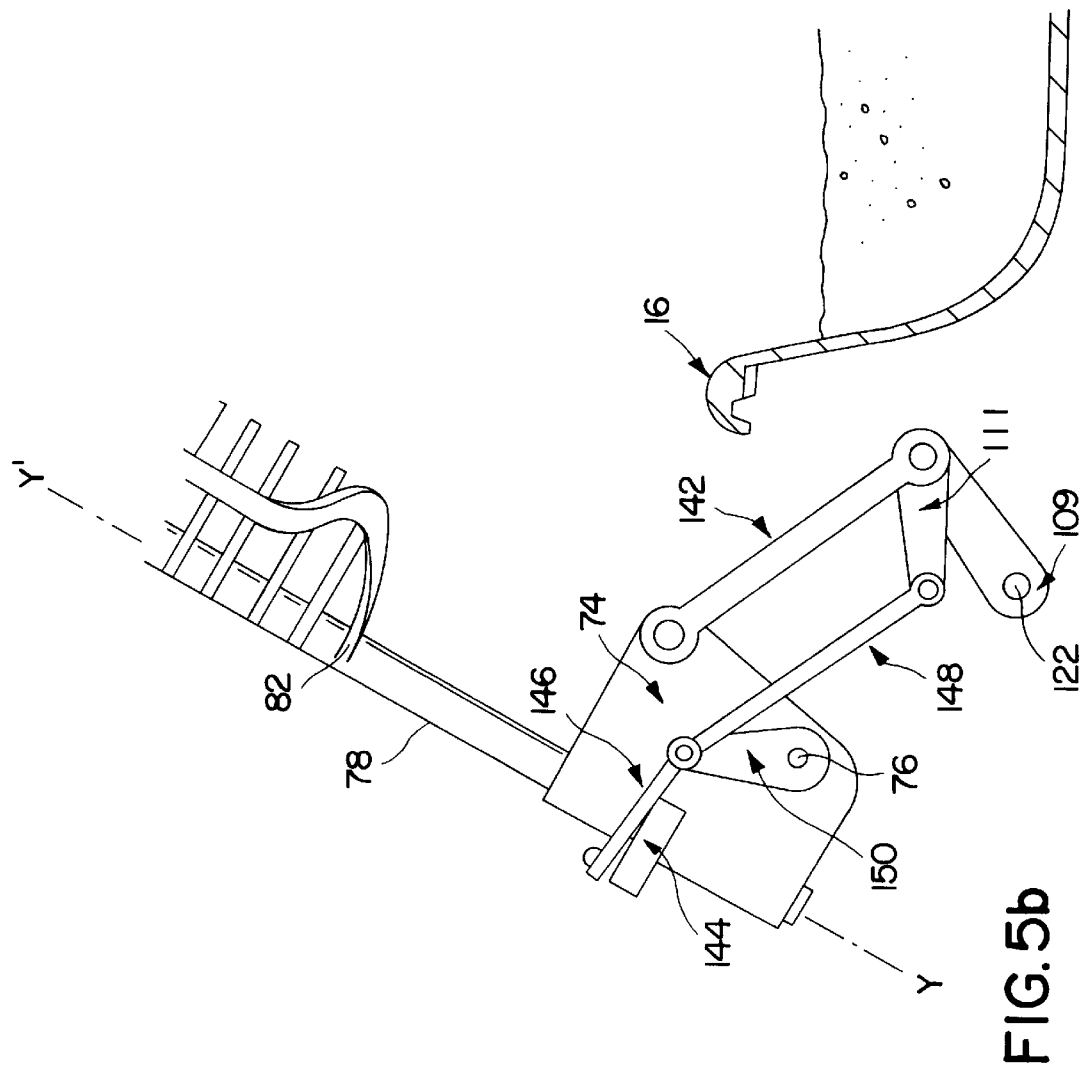
Figure 5E:
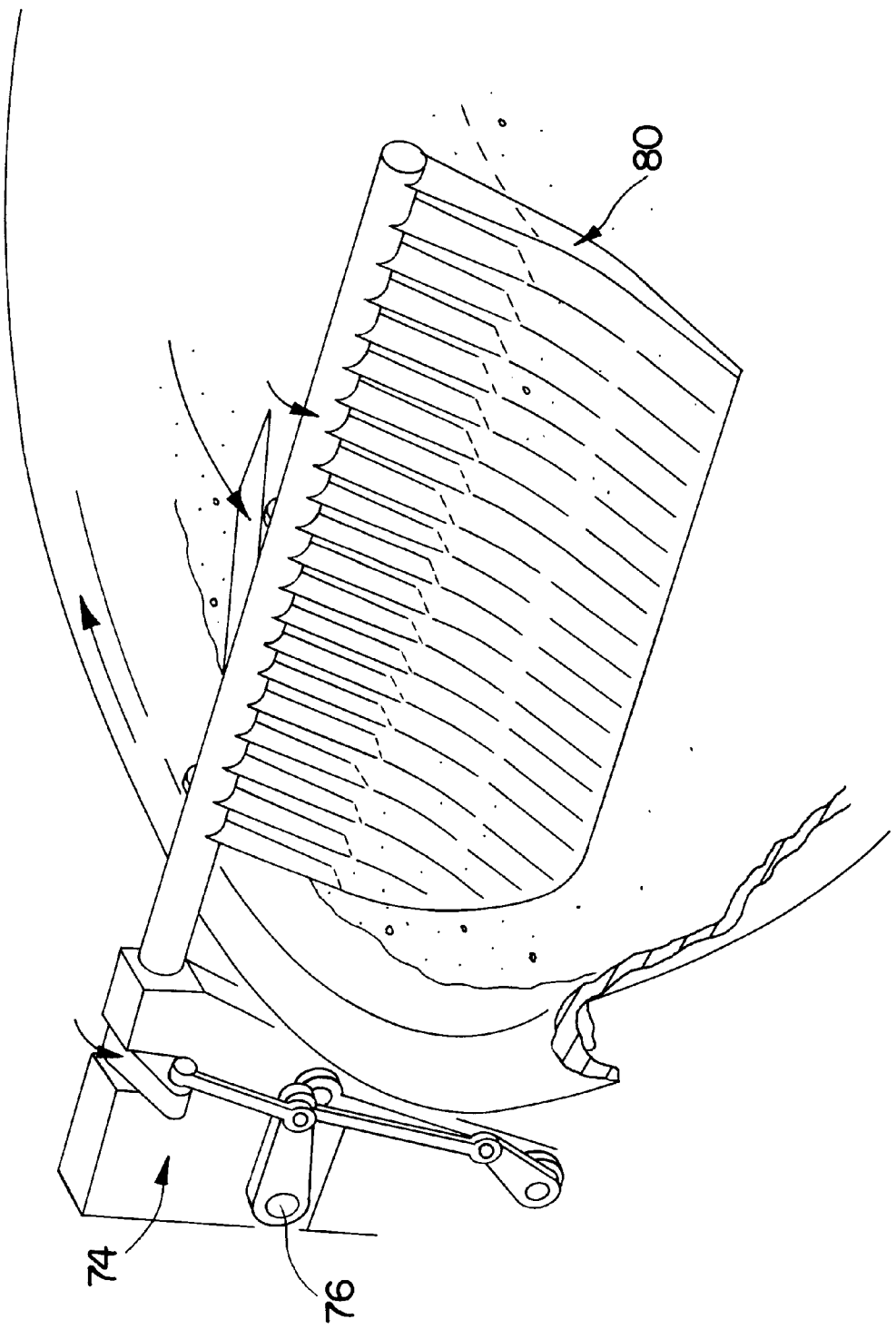
FIG. 5e is a perspective view of the rake assembly in position for cleaning the litter pan.

The general mode of operation of the litter box is initially for all components to be at rest and for the rake and level sensor to be parked in vertical position (see FIG. 5c) with the pan filled to optimum level with litter and ready for entry of a cat through the cover entry way.

After the cat voids and departs, the cat's departure is noted is noted by an electro-optical intrusion detector (FIGS. 8 and 9). An electronic control system receives a signal from the intrusion detector and, after lapse of a preset time following cat departure programmed into the control system, the litter box performs an operating cycle to clean the pan and add cat litter as needed. The preset time programmed into the control system may conveniently be selected as that time necessary for wet litter to clump into one piece with mechanical integrity permitting removal by rake, or about ten minutes for commercially available cat litter.

Accordingly, the driving mechanism rotates the pan about its vertical x-x' axis, lowers the rake subassembly to horizontal position of FIG. 1, and holds the rake stationary as the pan continues rotating. As the pan undergoes a full rotation, the stationary rake gathers waste, while the cat litter level sensor mounted behind the rake (FIG. 1) manipulates a hopper gate for replenishing the pan as necessary to maintain an optimal media level.

At the end of one pan rotation, the rake resumes movement and with a twisting movement of the rake lifts the waste out of the pan. Then as the rake moves from the horizontal toward the vertical, the rake deposits the gathered waste into the waste receptacle. The rake then returns to parked position (FIG. 5c) and remains stationary until the next operating cycle is initiated. The litter box has thus been cleaned and is ready to receive another pet.

The driving mechanism is provided with a limit switch which is actuated as the rake returns to parked position for the purpose of limiting pan rotation to two complete revolutions. At the beginning of a cycle as the rake disengages the limit switch, the switch is nulled or ignored for one second before being activated again for shutting down the drive motor at the end of a cycle when the rake returns to park.

The electrical control system including an electro-optical intrusion detector remains on and ready in both the movement cycle described, and while the litter box is waiting to receive another pet.

The electrical control system includes a control panel with a selector switch for several operating modes including a battery saving mode in which the litter box is cycled three times a day, a mode with the intrustion detector initiating a cycle ten minutes after each departure of a pet from the litter box, and a manual mode in which the litter box cycles at any time desired by the owner.

The control panel is also provided with indicators including a buzzer for low battery voltage, stalled motor (i. e., high motor current), an LED blinking green for motor operation, and an LED for automatic (i.e., three times a day) operation.

The electrical control system checks battery voltage 0.1 second into the operating cycle, and if the voltage is too low the system shuts down the drive motor. Similarly, the system monitors motor current by checking current every 0.1 second during motion of the driving mechanism and will shut down the motor to avoid a stalled motor and motor burnout if the current is excessive.

Referring again to FIGS. 1–3a, the litter box includes a box frame 12 and cover 14.

The cover includes a top panel 26 and depending side walls 28 enclosing substantially the entire upper portion of the box frame and together with the box frame defining a litter box chamber 30 for receiving a small animal, e. g. a household cat. The cover includes an access door 32 for entry and exit of a cat. The top panel is fitted with a control panel 34 for operating the litter box, and with a manual hinged door 36 through which the replenishment hopper is filled with cat litter. The cover side walls are contoured to fit around the replenishment hopper and the waste collection receptacle.

The box frame 12 includes upstanding peripheral side walls 40, an upper generally annular platform 42, and a central basin 44 located entirely within the outer walls for receiving and supporting the litter pan for rotation about vertical axis x-x'. The basin includes inclined side walls 46 depending from the inner edge 48 of the platform and a generally horizontal base panel 50 with an upwardly directed conical embossment 52 coincident with axis x-x' for the purpose of supporting and centering the pan 16 for rotation about the axis.

The box frame (FIGS. 3, 3a, and 4) provides additional support for the pan at three points about the pan rim by means of a pair of roller supports 54 each located in a recess 56 of the platform with the upper portion of each roller 54 extending above the platform surface for engaging a track 59 along the underside of the pan rim 16a. The roller supports are identical, and are positioned equilaterally from each other (at points R and R' in FIG. 3a) and from the drive gear 60. The rollers and drive pinion 60 provide the three points of pan support at the underside of the pan rim. Drive gear 60 engages and drives rim gear 58 for rotating the pan about its x-x' axis.

The pan 16 includes a pan body having a base 62 with inclined side walls 64 defining a receptacle for cat litter L, a peripheral rim 16a, and underside structure (FIGS. 3 and 4) including reinforcing ribs 66 and a downwardly open conical recess 68 for receiving the support embossment or axle 52.

The underside of the pan rim (see FIG. 4) is fitted with annular rim gear 58 for meshing with the drive gear 60. The rim gear occupies the inner portion the the rim underside with space between the rim gear and the outer margin 16b of the rim defining a support track 59 for engagement with the pan support rollers 54.

The box frame is recessed to accommodate the waste collection receptacle and the cat litter replenishment hopper all as shown in FIG. 1. Additionally, the box frame supports a drive housing 70 located in the space between the waste receptacle and replenishment hopper as best shown in FIGS. 1 and 3.

Actual removal of the pet waste from the cat litter pan is accomplished by means of a rake which rakes through the cat litter as the pan rotates, lifts waste from the pan, and deposits the waste in the waste receptacle located beside the pan.

The rake subassembly 22 is best shown in FIGS. 3, 5a–5e, and 6a–6b, and includes a support base 72 forming part of the drive housing 70 and a rake support plate 74 pivotally mounted to the base by shaft 76. A rake shaft 78 is mounted for rotataion on the shaft long axis y-y' along the top of the support plate and, when horizontally disposed as in FIG. 3, projects radially over the circular litter pan terminating just beyond the vertical central axis x-x' of the pan.

The rake (FIGS. 5a–5d) includes a set of concave rake teeth 80 normal to the rake shaft and extending into the pan 16 well below the normal litter surface and terminating just above the pan bottom. The rake also includes a perimeter band 82 extending from the rake shaft 78 and interconnecting the tips 80a of the rake teeth to align and strengthen the leading edge 84 of the rake.

A concave configuration of the rake (best shown in FIG. 5d) projects the teeth from the rake shaft downwardly at a relatively steep angle toward the cat litter, then forwardly at a shallower angle to promote removal of waste from the media by the rake and centering of the waste on the rake in the trough 86 formed at the angle junction of the upper 88 and lower teeth 90 segments so as to promote stability of the load as it is removed from the pan to the collection receptacle by the moving rake.

Figure 6A:
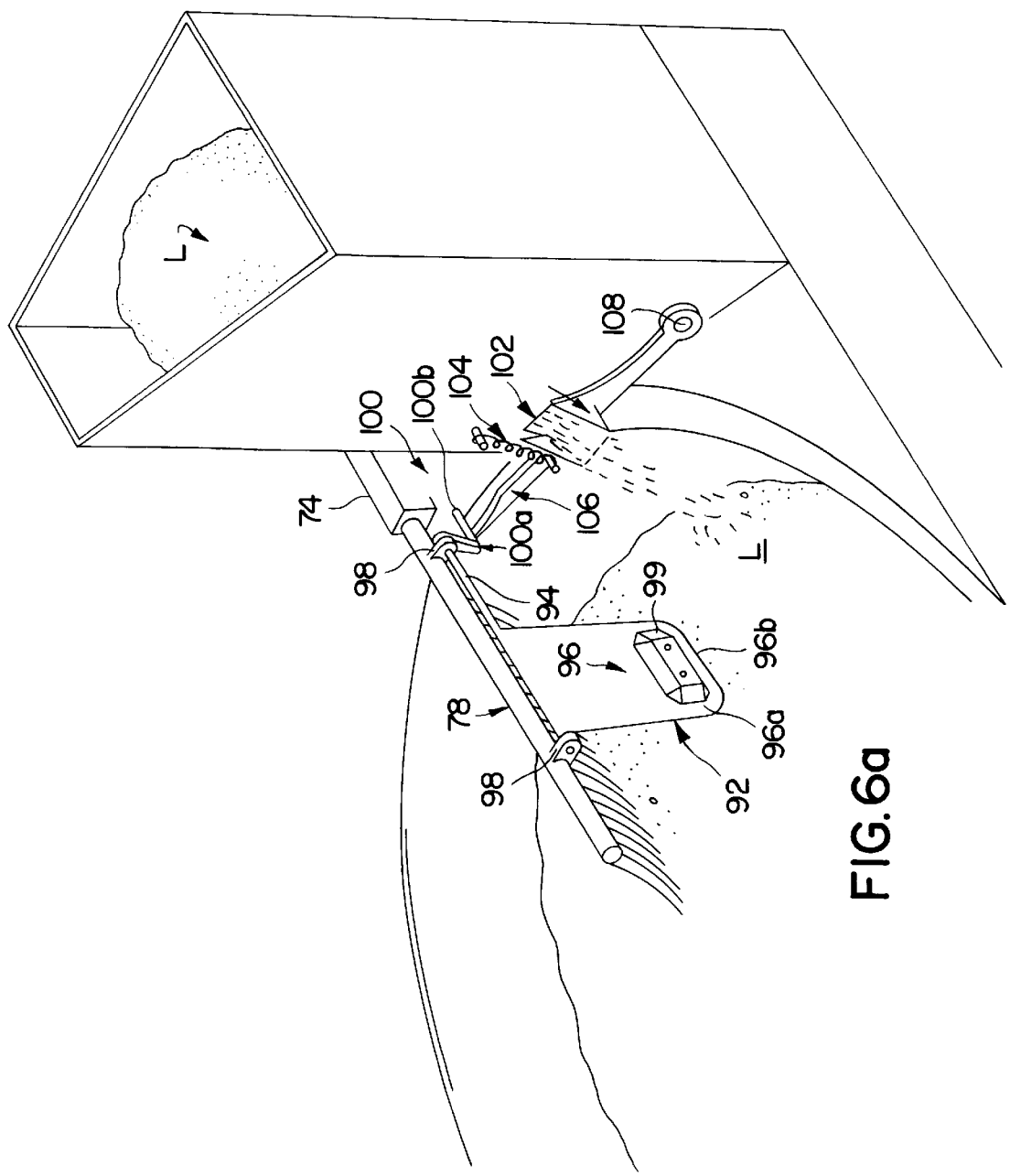
Figure 10:
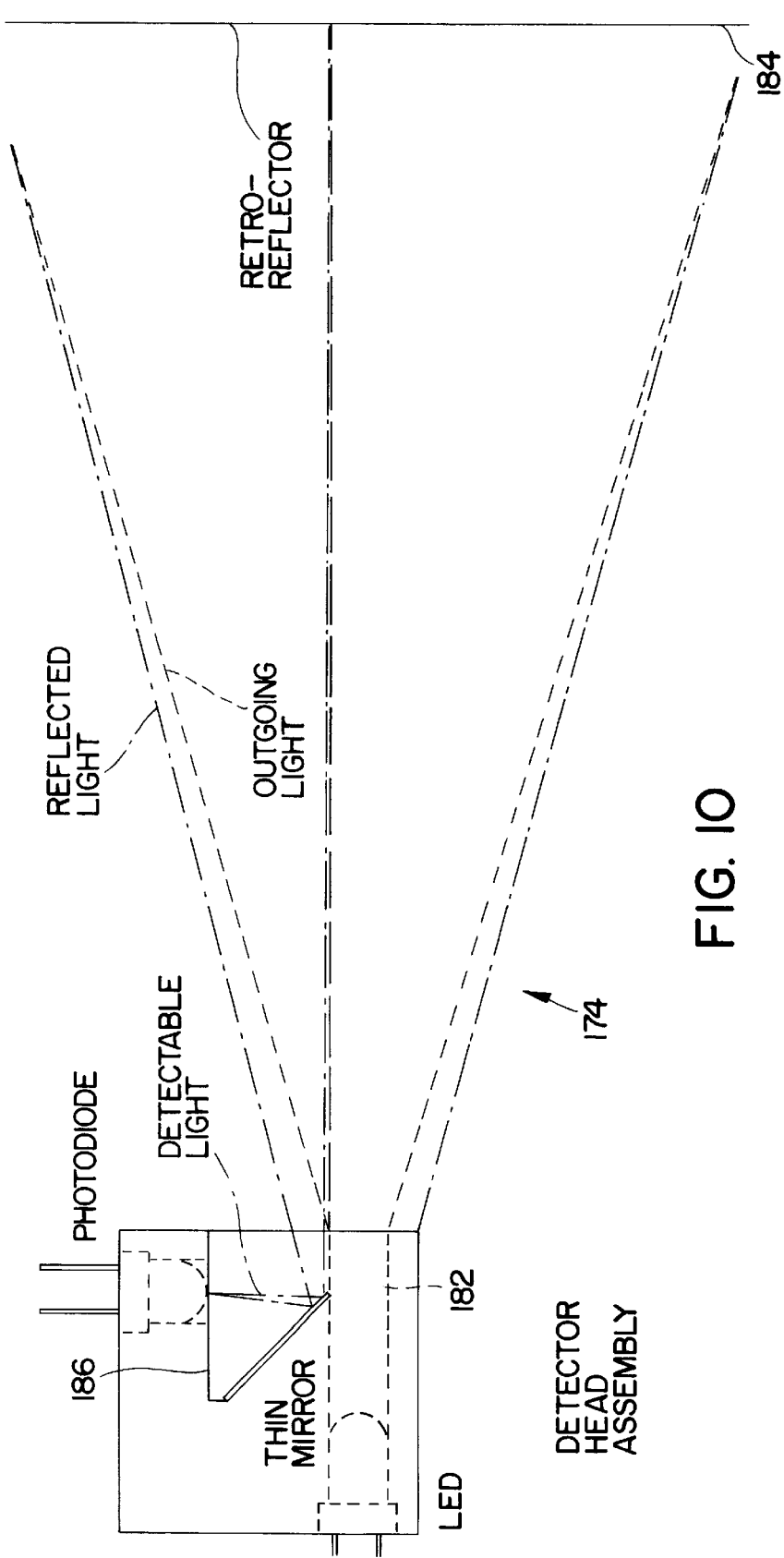
FIG. 10 is a schematic view showing operating components of the electro-optic sensor of the preferred embodiment.
Figure 11:
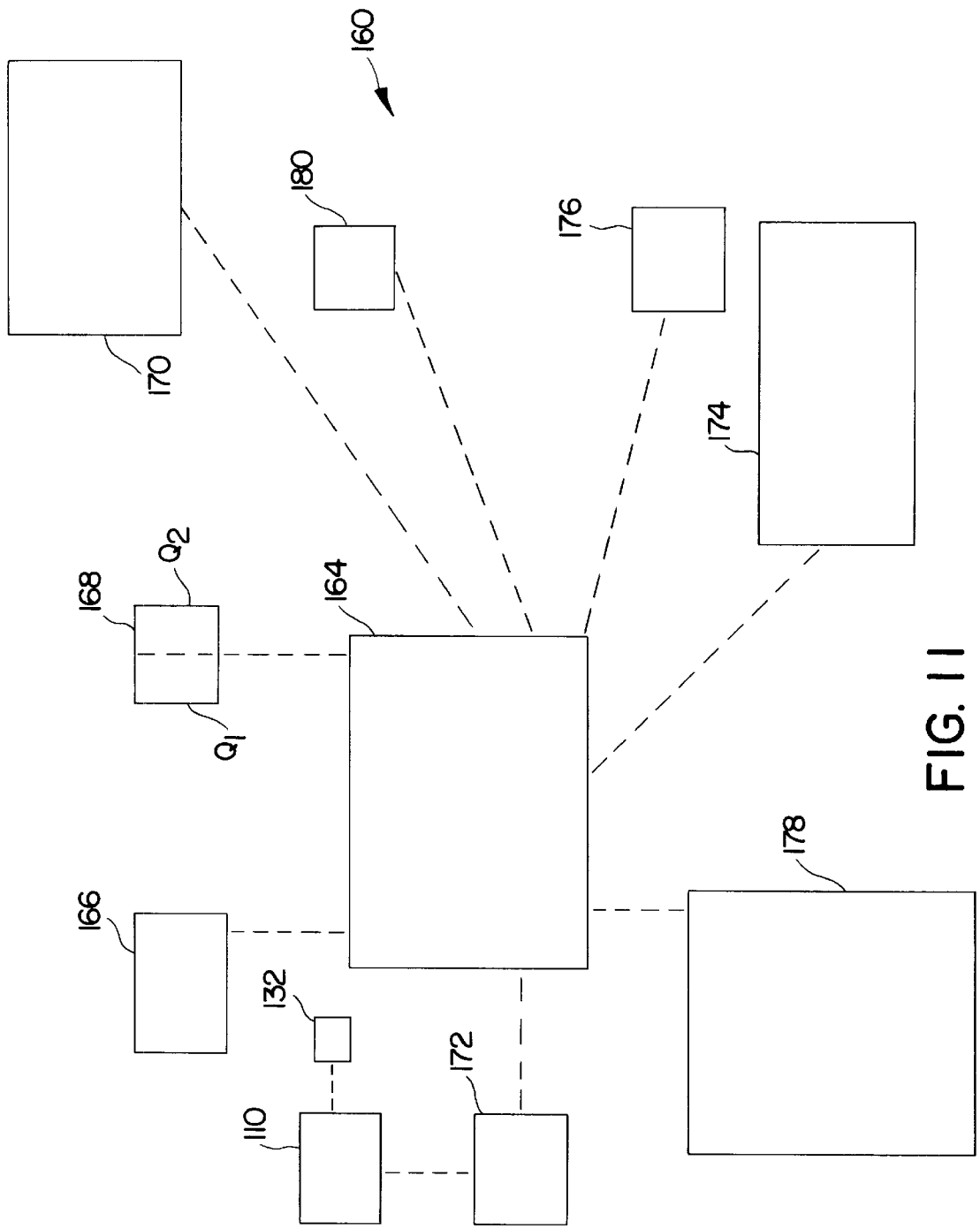
FIG. 11 is a schematic of electronic control system components for the invention.

As seen in FIGS. 6a–6b, the rake shaft 78 also mounts a level sensor paddle 92 comprising a mounting shaft 94, and a flat plate or paddle 96 with the shaft rotatably fitted into support brackets 98 projecting from the back side of the rake shaft. The tip 96a of the paddle may be fitted with a weight 99 urging the paddle edge 96b into firm contact with the surface of the litter L and providing a moment arm for actuation of a sensor lever 100.

The level sensor includes lever 100 in the form of a crank 100a and lever arm 100b for actuating a gate and chute 102 fitted to the replenishment hopper by means of a spring 104 biased gate lever 106, pivoted at 108 to the hopper.

The paddle rotates under the influence of a paddle counterweight on its mounting shaft to a generally vertical orientation and the paddle "senses" a low level of cat litter in the pan (FIG. 6a). The moving paddle rotates the sensor lever and gate lever to open the gate and chute thereby adding litter to the pan. The paddle edge gradually rises with the level of added litter, and rotates toward horizontal (FIG. 6b) until the replenshing gate closes. It should also be noted at this point that the rake spreads and levels added litter across the diameter of the pan as it rotates during operation (i.e., clockwise as seen in FIG. 6a).

When the rake is in the parked position, the paddle disengages the sensor lever and gate lever and the replenishing gate closes so no litter can be added while the rake is parked.

In the event the motor stalls while the rake is horizontal with the replenishing gate open, litter will continue to flow from the replenishment hopper to the pan. To avoid this situation, a modified hopper gate in the form of a chute 109, shown in FIG. 6c, is rotatably mounted about a horizontal axis on the hopper wall. The chute is normally in the down position with its opening 109a positioned at the optimal litter level for the pan. The chute passes litter as long as the opening is above the pan litter level. Litter flow through the chute stops when the litter level rises and closes the chute opening. The chute may be rotated out of the way with opening 109a directed upward for removal of the pan, filling the hopper with litter, etc.

The drive mechanism 24 for rotating the cat litter pan and for manipulating the rake and level sensor is shown in FIGS. 7a and 7b. The drive mechanism is mounted on the drive housing 70 of support base visible in FIG. 3 and shown in dash lines in FIGS. 7a and 7b.

The rake crank 109 and crank extension 111 are on the near side (FIG. 3) of the drive housing 70 and all remaining components are on the far side. The drive housing includes upstanding walls and a top panel.

As shown in FIGS. 7a and 7b, the drive mechanism includes an electric motor 110, reduction gear box 112, worm 114 and worm gear 116, drive shaft 118, and gear 60 for engaging and driving the pan rim gear 58. As noted, the pan rotates two revolutions for each operating cycle of the litter box.

During an operating cycle, the rake moving mechanism lowers the rake from a vertical parked position (FIG. 5c) to horizontal raking poisition (FIG. 5a), keeps the rake stationary in raking position as the pan rotates, twists the rake and rake shaft (about horizontally disposed rake shaft axix y-y') to lift rake teeth and waste out of the cat litter, raises the rake to vertical for depositing waste in collection receptacle, and finally twists the rake and rake shaft (about vertically disposed rake shaft axis) to the parked position.

Rotary power for moving the rake mechanism is supplied by worm gear 116 to intermediate shaft 120, and to rake crank drive shaft 122 via section gear 124 and crank drive gear 126.. The section gear provides intermittent drive to the crank gear while their teeth mesh. When meshing (FIG. 7b), the rake crank 109 rotates one full revolution. When out of mesh (FIG. 7a), key cam 128 and lock cam 130 are engaged to prevent rotation of the rake crank shaft (i.e., the rake is held stationary) while the rake is raking the cat litter pan. A limit switch 132 and switch cam 134 shut down the drive motor after one revolution.

The rake manipulating linkages 140 are shown in FIGS. 3, 5a–5c. The linkages move the rake from parked to raking to parked, and also twist the rake about its longitudinal shaft axis.

As noted the rake support plate 74 is pivotally mounted on the drive housing 70 at pivot shaft 76. The rake crank 109 and crank arm 142 move the rake between vertical (FIG. 5c) and horizontal (FIG. 5a). This basic down and up movement occurs while the section gear 124 engages and drives the crank drive gear 126 (FIG. 7b).

The rake twist linkage comprises a rake twist arm 144 positioned in recess 74a and fixed to rake shaft 78, rake twist first 146 and second 148 links and idler link 150, and crank arm extension 111. The crank arm extension 111 is locked to and rotates with the crank arm 109 so that the intermediate links (146, 148, and 150) oscillate or twist the rake shaft 78 about its long axis y-y' producing an upward twist of the rake to lift and remove waste from the litter, and a return twist moving the rake into parked position after the rake deposits waste in the collection receptacle. The linkage sequence is shown in FIGS. 3, 5a–5c. The length of crank arm extension 111 is critical to minimizing torque required of the motor when rotating the pan and lifting the rake and must be carefully determined to avoid binding of the linkages and well as coming to rest in either a top or bottom dead center position.

Referring now to FIGS. 8–11, the electronic control system 160 including the electro-optical intrusion system are illustrated. The control system comprises a microprocessor 164, power input circuit 166, auxiliary power switch 168, control panel 170, motor drive switch 172, pan and rake drive motor 110, limit switch 132 (also seen in FIGS. 7a–b), cat detector circuit 174, oscillator 176, system component comparators 178, and buzzer driver 180.

The cat detector circuit 174 (FIGS. 3, 9, 10) including light source 182, retro-reflector 184, and light sensor 186 are positioned to emit and reflect a light beam across the cat litter pan in position for the beam to be interrupted whenever a cat enters the litter box. The retro-reflector may be located on an end wall of the cover as in FIG. 8, or on the inside surface of an access door 32 (FIG. 9). The light source and light sensor comprise a detector head assembly including a light emitting diode (LED) unit. When the LED is excited by the cat detector circuit, the LED emits a pulse of light which travels to the retro-reflector and is reflected back to the LED in an approximate anti-parallel fashion. A thin mirror is located at the tangent of the LED exit aperture to gather the corona of reflected light formed about the exit aperture and direct it to the photodiode detector. The photodiode generates a pulse of current for each pulse of light emitted by the LED. The current is processed to provide a "no-cat present" signal back to the cat detector circuit.

The presence of a cat in the litter box is detected electronically in the following manner. The cat detection circuit originally generates the LED drive pulse and the circuit synchronously detects the level of the signal generated. If the amplified signal level is greater than approximately one-half of the supply voltage for the detection circuit by the time the initial drive pulse ends, the output signal supplied to the microprocessor remains low. If however the level of the signal generated does not reach one-half the supply voltage for the detection circuit by that time, the output signal from the cat detection circuit goes high and stays high at least until the end of the next output pulse (32 milliseconds). Thus, a cat entering the litter pan area blocks the light path from the detector head assembly to the retro-reflector with the result that the level of the signal generated by the detector head assembly does not reach one-half the supply voltage. The output signal from the cat detection circuit goes high and the microcomputer records the presence of a cat and takes appropriate action.

The cat litter box electronic control system, electro-optical intrusion detector, and mechanical functions commence operating when the electronic system is energized. The microcomputer initiates a preset period of repose with the electro-optical intrusion system function. The period of repose is abitrarily set as a delay after the cat has departed plus a reasonable additional safety margin so as to not frighten the animal at motor startup and for practical purposes can be set at ten minutes. This period is also needed to allow wet litter to clump into a coherent mass for one-piece removal from the pan by the rake.

After lapse of the period of repose without any interruption as by the entering cat setting off the intrusion detector, the microcomputer intitiates drive motor operation wherein the drive motor rotates the pan and brings the rake from parked position to raking position with the rake penetrating the litter through the intermediation of the rake mechanical linkages. Next, the motor continues to rotate the litter pan one revolution while the cam key and the cam lock hold the rake against movement. During this pan revolution, the rake acting in the manner of a grate engages and gathers solid waste and litter clumps. In addition, during pan rotation, the litter level paddle senses the litter level, and if the level is below optimal, then the paddle level actuates the gate lever to open the hopper gate adding litter from the replenishment hopper. Added litter is spread across the litter surface by the deployed rake.

After one pan revolution, the cam key and the cam lock are disengaged, and while the pan is rotating, continued motor operation through the rake linkages causes the rake to twist relative to its long axis thereby lifting waste out of the litter. In this action the rake takes little or no unsoiled litter. Next, the rake pivots upward carrying waste above the collection receptacle opening and tipping the waste into the receptacle. After pivoting to the vertical, the rake again twists about its long axis to a park position. At this point the limit switch is engaged by the limit cam and the motor is secured and the pan stops rotating.

The electro-optical detector continually monitors the pan area while other operating components are in motion or at rest. Subsequent operation will be initiated by an exiiting cat being detected as above. If desired, subsequent operation may be programmed periodically as once or several times daily without prompting by the intrusion detector to conserve battery power.

Power saving features are an important part of the present invention for enabling long term operation of the litter box on battery power. Accordingly the electronic control system has been designed with components and operating conditions selected for minimal power consumption. As a result the litter box is operable for an extended period of time (one year, for example) without the need for a standard wall outlet power supply. Thus an apartment dweller or any householder for that matter can place the litter box in a bathroom without the need for a power outlet.

The invention provides for litter box operation for a period of one year with a set of four D-cell batteries connected in series with each battery having a capacity of 8,800 milliampere-hours and an end-of-life voltage of 1.2 volts. The litter box cleaning mechanism is therefore designed to operate at 4.8 volts (drive motor plus motor drive transistor voltage drop).

The drive and cleaning mechanism for the litter box has a low torque requirement consistent with long battery life. The drive and cleaning mechanism employs a low power motor with average current drawn not exceeding 1 milliampere. The lowest torque needed to operate the drive mechanism is 16 inch-ounces equal to a power requirement of 0.113 Joules. In prototype testing, the assumed overall power consumption of the motor was 0.745 watts, after allowances for motor efficiency (50%), gear reducer (55%), and drive mechanism (55%). With an average voltage of 5.4 volts applied to the motor over the life of the battery, the expected motor current is 138 milliamperes. To meet the requirement of an average current draw of 1 milliampere with a cleaning cycle period of about three minutes, three cycles per day would yield an average current of 0.86 milliamperes.

Therefore design refinement yielded a speed reduction of 435 with motor 110 (FIG. 7a) of 6200 RPM nominal shaft speed and 14.2 RPM for the output shaft 118. The drive gear 60 has a diameter of 0.75 inches and the pan diameter is 18 inches so that 24 output shaft revolutions are required to rotate the pan 360° and 48 revolutions to complete a cleaning cycle. In this way the cleaning cycle time is 3.38 minutes. The actual motor current measured on the prototype was only 120 milliamperes so the actual current consumption based on three cycles per day is 18 milliampere-hour/day well within battery capacity of 24.1 milliampere-hour/day.

The drive motor 110 is selected to provide maximum efficiency at a torque level of 16 inch-ounces operating at 5.4 volts and an output shaft speed 118 of close to 16 RPM while consuming less than 138 milliamperes. The selected motor has a shaft speed of 6200 RPM with an output torque of 0.0875 inch-ounce at a winding voltage of 5.4 volts. The motor is combined with a gear-reducer 112 with a ratio of 435:1 with the gear-motor combination yielding up to 38 in-oz of torque at an output shaft speed of 14.25 RPM at a current of 140 milliamperes.

The electronic control system includes auxiliary circuits to monitor supply voltages, the presence/absence of a cat in the litter pan, and motor current when the motor is operating. The power to operate these circuits is next considered.

A voltage comparator is used to monitor the supply voltages and monitor the motor current when the motor is operating. A low cost voltage comparator that consumes about 1 mA is used with power applied only when it is needed. In accordance with the invention, the voltage comparator is turned on once every second for a duration of 0.1 second during the last 13 minutes (3 minutes cycle time plus 10 minutes clumping time) of every eight hour shift, (i.e. automatic machine cycle three times a day at eight hour intervals in the power save mode). With the operating conditions, average power consumption is only 2.7 microamperes.

The electro-optical cat detecting unit 162 comprises three power consuming sections: the detector chip, the optical signal amplifier, and the light emitting diode (LED). The chip contains a synchronous detector which emits drive pulses for the LED and samples the response of the optical signal amplifier at the end of each pulse period. This provides an indication to external circuitry which only changes at the end of each sample interval or about 32 milliseconds. The power saving feature of this device is that the duty cycle of the LED drive pulses is only 0.1% An additional power saving feature is that this device is provided with a power consumption of about 10 microamperes.

The optical signal amplifier converts the current pulses from the PIN diode detector in the detector head to voltage pulses which are subsequently sampled by the chip detector. When no cat is present in the litter pan, the amplifier output is high at the end of the sample interval. If a cat is present, the light beam is blocked (no current pulses from the detector head) and the amplified output is low. The amplifier consumes about 2 milliamperes.

The LED is driven with large currents enabling it to provide a strong illumination of the retro-reflector and subsequently strong corona illumination of the PIN diode detector. The current amplitude is about 100 milliamperes. In taking the duty cycle of the drive pulses into account (0.1%), the actual average LED forward current is only 100 microamperes.

The auxiliary power switch 168 is formed by a two-stage transistor amplifier (Q1 and Q2) in the drawing. When the switch is turned on, current flows from the supply through the base emitter junction of Q2 and is limited by a resistor. As a result the switch consumes 4.5 milliamperes.

When in the power saving mode of automatic operation at eight hour intervals three times daily, these devices are turned on for the last 13 minutes of each eight hour interval or shift with a 10% duty cycle (once per second for a duration of 0.1 second). As a result, the total power consumption is:

6.61 mA×13 min.×1 hr/60 min.×0.1×3/day=0.429 mAh/day

The microcomputer 164 for the electronic control system embodies three main operational requirements: (i) it has the computational abitity to control the operating system, (ii) it is inexpensive, and (iii) it consumes very little power since it is running all of the time. The microcomputer selected meets these requirements, however its low power consumption was further reduced by clocking the device at 64 kHz. In this way, power consumption was reduced by a factor of 62.5% as compared to clocking the device at rated speed. Specifically, the average current for the device while running was reduced to 88 microamperes from 5.5 milliamperes, and while waiting for timeouts current was reduced to 24 microamperes.

Since the power save mode software for the microcomputer is written with the device spending 97% of its time waiting for timeouts, the average power consumption for the microcomputer is only 26 microamperes.

The microcomputer selected requires an additional external shift register to accommodate the large number of imputs needed for the system. The shift register consumes approximately 5 microamperes increasing the total microcomputer consumption to 31 microamperes or 0.744 milliampere-hours per day.

The eletronic control system futher includes a control panel 170 LED (green) which blinks while the motor is running. The LED blinks once each second for 64 milliseconds equivalent to a 1/16th duty cycle. The current through the LED is about 16 milliamperes with average current being 1 milliampere. Since the LED blinks only while the motor is running, and in the power save mode the motor runs for three minutes once every eight hours, the average actual current is:

$$1 \text{ mA} \times 9 \text{ min/day} \times 1 \text{ hr}/60 \text{ min} = 0.15 \text{ mA-h/day}$$

As noted above, the power save mode of the electronic control system operates the cycling mechanism and the auxiliary power devices for three minutes at a time, three times a day. The microcomputer, oscillator, and shift register are operated at all times. Power consumption in this mode for system components is:

| | |
|---|---|
| motor current: | 18.0 mA-h/day |
| auxiliary power: | 0.429 " |
| microcomputer: | 0.744 " |
| LED (blinking green) | 0.15 " | or a total of 19.323 mA-h/day.

With a total battery capacity (four D-cells) of 8,800 mAh, the maximum run time of the litter box is 455 days.

With a low-power oscillator frequency tolerance of +/−30%, the best run time is 455+30% or 591 days, and worst run time is 455−30%, or 318 days.

In the normal mode of operation of the litter box, the system cycles ten minutes after the departure of a cat. Assuming a household with two cats with each cat entering the litter box ten times a day, the motor current of 120 mA for 20 three minute cycles per day equals 120 mA-h/day.

Various changes may be made to the structure embodying the principles of the invention. The foregoing embodiments are set forth in an illustrative and not in a limiting sense. The scope of the invention is defined by the claims appended hereto.

We claim:

1. A self cleaning pet litter box for receiving animal waste comprising a support frame, an upwardly open receptacle having a vertical axis and containing litter media distributed about the vertical axis, the receptacle being mounted on the support frame for rotation about the vertical axis, means for rotating the receptacle and media about the vertical axis, a collection container for receiving the animal waste, means for screening the litter media as the receptacle rotates thereby gathering animal waste from the litter media, said screening means moving independently of the receptacle for lifting the gathered animal waste out of the litter media and depositing the gathered animal waste into the collection container, and said screening means being moved to a parked position clear of the litter media after depositing waste into the collection chamber.

2. A self cleaning pet litter box for receiving animal waste comprising a support frame, an upwardly open receptacle containing litter media distributed about a vertical axis, the receptacle being mounted on the support frame for rotation about the vertical axis, means for rotating the receptacle and media about the vertical axis, a collection container for receiving the animal waste, and means for screening the litter media as the receptacle rotates thereby gathering animal waste from the litter media, said screening mean moving independently of the receptacle for lifting the gathered animal waste out of the litter media and depositing the gathered animal waste into the collection container, said screening means being moved to a parked position clear of the litter media after depositing waste into the collection chamber, and means for monitoring the level of litter media in the receptacle and adding litter media to maintain an optimal level in the receptacle.

3. A self cleaning pet litter box for receiving animal waste comprising a support frame, an enclosed cover superimposed on the frame and together with the frame defining a pet voiding chamber, the cover having means through which a pet enters and exits the chamber, an upwardly open pan containing litter media distributed about a vertical axis, the pan being mounted on the support frame within the pet voiding chamber for rotation about the vertical axis, means for rotating the pan and media about said vertical axis, a collection container mounted on the frame adjacent the pan for receiving the animal waste, rake means for gathering animal waste from the litter media, the rake means moving independently of the receptacle and having a first position remote from the pan, a second position in which the rake means engages the litter media, and a third position in which the rake means deposits animal waste into the collection container, means for moving the rake means from the first position to the second position so that the rake means gathers animal waste in the litter media as the pan and media rotate about said vertical axis, and means for moving the rake means from the second position to the third position so that the rake means deposits gathered animal waste into the collection container.

4. A self cleaning pet litter box for receiving animal waste comprising a support frame, an enclosed cover superimposed on the frame and together with the frame defining a pet voiding chamber, the cover having means through which a pet enters and exits the chamber, an upwardly open pan containing litter media distributed about a vertical axis, the pan being mounted oil the support frame within the pet voiding chamber for rotation about the vertical axis, means for rotating the pan and media about said vertical axis, a collection container mounted on the frame adjacent the pan for receiving the animal waste, rake means for gathering animal waste from the litter media, the rake means moving independently of the receptacle and having a first position remote from the pan, a second position in which the rake means rakes the litter media, and a third position in which the rake means deposit animal waste into the collection container, means for moving the rake means from the first position to the second position so that the rake means gathers animal waste in the litter media as the pan and media rotate about said vertical axis, means for moving the rake means from the second position to the third position so that the rake means deposits gathered animal waste into the collection container, and intrusion detection means responsive to the presence of a pet in the chamber for preventing rotation of the pan and movement of the rake means.

5. A self cleaning pet litter box for receiving animal waste comprising a support frame, an enclosed cover superimposed on the frame and together with the frame defining a pet voiding chamber, the cover having mean through which a pet enters and exits the chamber, an upwardly open pan containing litter media distributed about a vertical axis, the pan being mounted on the support frame within the pet voiding chamber for rotation about the vertical axis, means for rotating the pan and media about said vertical axis, a collection container mounted on the frame adjacent the pan for receiving the animal waste, rake means for gathering animal waste from the litter media, the rake means moving independently of the receptacle and having a first position remote from the pan, a second position in which the rake means digs into the litter media, and a third position in which the rake means deposits animal waste into the collection container, means for moving the rake means from the first position to the second position so that the rake means gathers animal waste in the litter media as the pan and media rotate about said vertical axis with respect to the rake, means for moving the rake means from the second position to the third position so that the rake means deposits gathered animal waste into the collection container, a litter media hopper for adding litter media to the pan being mounted on the frame adjacent the pan, means for monitoring the level of litter media in the pan and for adding litter media to the pan from the hopper in order to maintain an optimal media level, and intrusion detection means responsive to the presence of a pet in the chamber for preventing rotation of the pan and movement of the rake means.

6. A self cleaning pet litter box as defined in claim 5 in which the means for monitoring the level of media in the pan and for adding litter media comprises a chute rotatably mounted on the hopper.

7. A self cleaning pet litter box as defined in claim 5 in which the means for monitoring the level of media in the pan and for adding litter media comprises a paddle mounted on the rake for sensing the media level, a gate in the hopper for delivering litter media to the pan, and levers interconnecting the paddle and gate to open the gate when the paddle senses a low media level.

8. A self cleaning pet litter box for receiving animal waste comprising a support frame, an enclosed cover superimposed on the frame and together with the frame defining a pet voiding chamber, the cover having an access port through which a pet enters and exits the chamber, an upwardly open pan for containing an optimal level of litter media for deposit of animal waste, the pan being mounted on the support frame within the pet voiding chamber for rotation about a generally vertical axis, means for rotating the pan about said axis, a collection container mounted on the frame adjacent the pan for receiving the animal waste, a rake moving independently of the receptacle for gathering and removing animal waste from the litter media, the rake having a first parked position remote from the pan, a second position in which the rake digs into the litter media for screening the litter media to gather the animal waste as the pan rotates, and a third position in which the rake has lifted the animal waste from the litter media and deposits animal waste into the collection container, means for moving the rake from the first position to the second position, means for twisting the rake thereby lifting the rake and gathered animal waste from the litter media, means for moving the rake from the second position to the third position, means for twisting the rake and thereby returning the rake to its first position, a litter media hopper having a dispensing gate for adding litter media to the pan, the hopper being mounted on the frame adjacent the pan, means for monitoring the level of litter media in the pan and for opening the gate to add litter media to maintain an optimal media level, and an electro-optical intrusion detection means responsive to the presence of a pet in the chamber for preventing rotation of the pan and movement of the rake while the pet is present in the chamber and for a predetermined time period thereafter.

9. A self cleaning pet litter box as defined in claim 8 in which the means for rotating the pan is a motor driven pinion, and in which the pan has a base panel and an upstanding side wall defining a litter media receiving receptacle, an annular rim projecting outwardly from the side wall, and an endless gear track disposed along the rim for driving engagement by the pinion.

10. A self cleaning pet litter box as defined in claim 8 in which the frame includes a plurality of rollers for supporting the pan, the means for rotating the pan is a motor driven pinion, and in which the pan has a base panel and an upstanding side wall defining a litter media receiving receptacle, an annular rim projecting outwardly from the side wall, an endless gear track disposed along the rim for driving engagement by the pinion, and the rollers engaging the rim and together with the pinion providing rotational support for the pan.

11. A rake mechanism for gathering and removing animal waste from a self cleaning pet litter box, the box including a support frame, an upwardly open receptacle for containing litter media mounted for rotation about a vertical axis on the support frame, and means for driving the receptacle and the rake mechanism, the rake mechanism comprising a rake having an elongate shaft and a rake grate normal to the shaft, a supporting plate for the rake mounted on the support frame for rotation on a generally horizontal axis, the rake shaft mounted on the support plate for rotation about the long axis of the shaft, a first linkage including a drive crank connected to the driving means and a crank arm pivotally interconnecting the drive crank and the rake support plate whereby rotation of the drive crank pivots the plate about its horizontal axis so that the rake moves from a first generally vertical position to a generally horizontal position overlying the litter receptacle, and a second linkage for twisting the rake about its elongate axis including a crank extension affixed to the drive crank, a rake twist arm affixed to the rake shaft, a rake twist idler link rotatable about said generally horizontal axis, first and second rake twist links respectively interconnecting the crank extension and the idler link, and the idler link and the rake twist arm whereby rotation of the drive crank produces a twisting movement of the rake shaft on its long axis.

12. A rake mechanism as defined in claim 11 in which the rake moves between vertical and horizontal positions about the horizontal axis, and the rake twists approximately 90 degrees with respect to its elongate shaft.

13. An intrusion detector for a self cleaning pet litter box having a support frame, an enclosed cover superimposed on the frame and together with the frame defining a pet voiding chamber, the cover having an access port through which a pet enters and exits the chamber, an upwardly open pan for containing litter media for deposit of animal waste, the pan being mounted on the support frame within the pet voiding chamber, the intrusion detector comprising a detector head assembly mounted in the chamber on one side of the pan for projecting a light beam across the open pan to the other side, a retro reflector mounted within the chamber on the other side of the pan for reflecting the light beam back to the detector head assembly on an anti-parallel path, the detector head generally further having a reflecting mirror for directing the corona of the reflected light beam to a photodiode for issuing a current pulse indicating the non-presence of an animal in the chamber.

* * * * *